Nov. 12, 1940.  E. F. McTARNAHAN  2,221,715
ROTARY MILL
Filed Aug. 10, 1939  3 Sheets-Sheet 1

Inventor
E. F. McTarnahan
By L. J. Randolph
Attorney

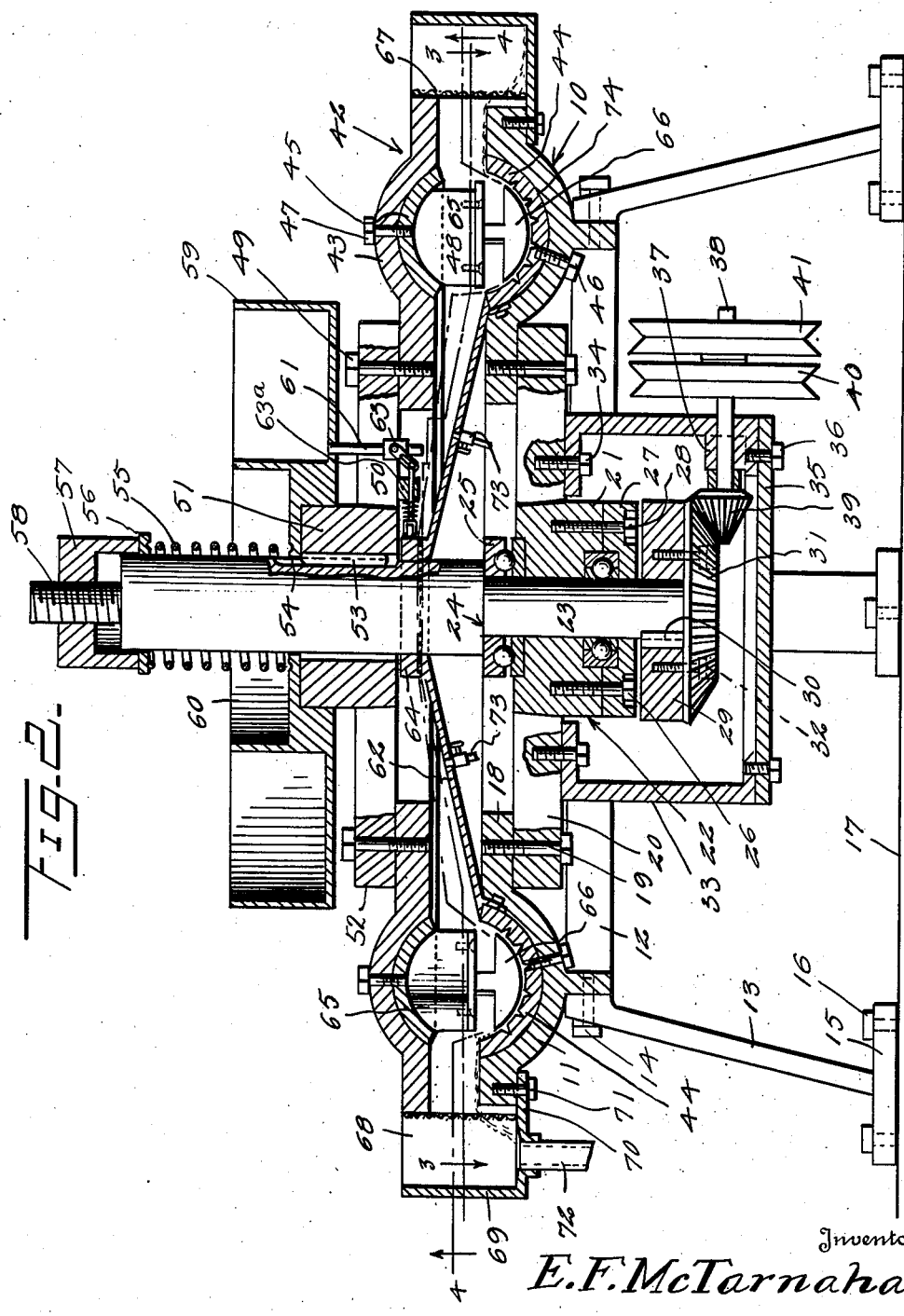

Inventor
E. F. McTarnahan
By L. F. Randolph
Attorney

Patented Nov. 12, 1940

2,221,715

UNITED STATES PATENT OFFICE 2,221,715

ROTARY MILL

Edward F. McTarnahan, Seattle, Wash.

Application August 10, 1939, Serial No. 289,472

3 Claims. (Cl. 83—45)

This invention relates to a mill primarily adapted for use in connection with ores.

It is aimed to provide a construction which is simple, relatively inexpensive, operates with low power consumption, utilizes balls as the crushers in combination with means to roll the balls and serve as a fly wheel, a construction which avoids sliming, a construction which will scavenge itself clean immediately after the feed is cut off, and a construction which will mill or crush with equal facility, hard, soft, wet and dry dirts or ore.

It is another object to provide a novel construction wherein spring tension equalizes the pressure on the running parts.

The more specific objects and advantages will become apparent from a consideration of the description following taken in connection with the accompanying drawings illustrating an operative embodiment.

In said drawings—

Figure 2 is a vertical section taken substantially on the line 2—2 of Figure 1;

Figure 1:
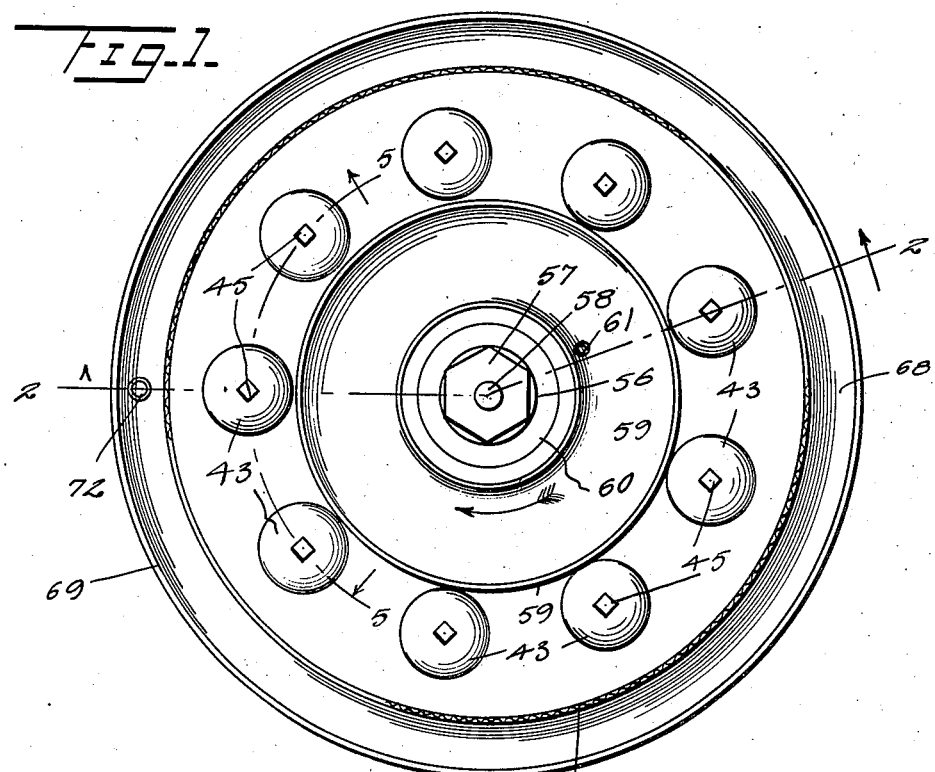
Figure 1 is a view of the apparatus in plan.
Figure 3:
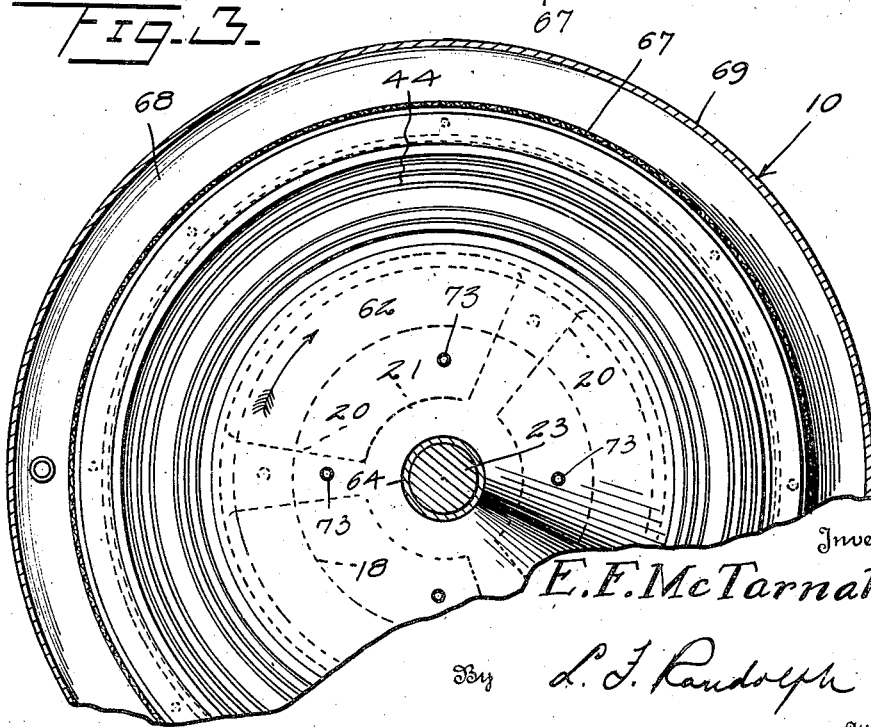
Figure 3 is a horizontal section taken substantially on the line 3—3 of Figure 2.
Figure 4:
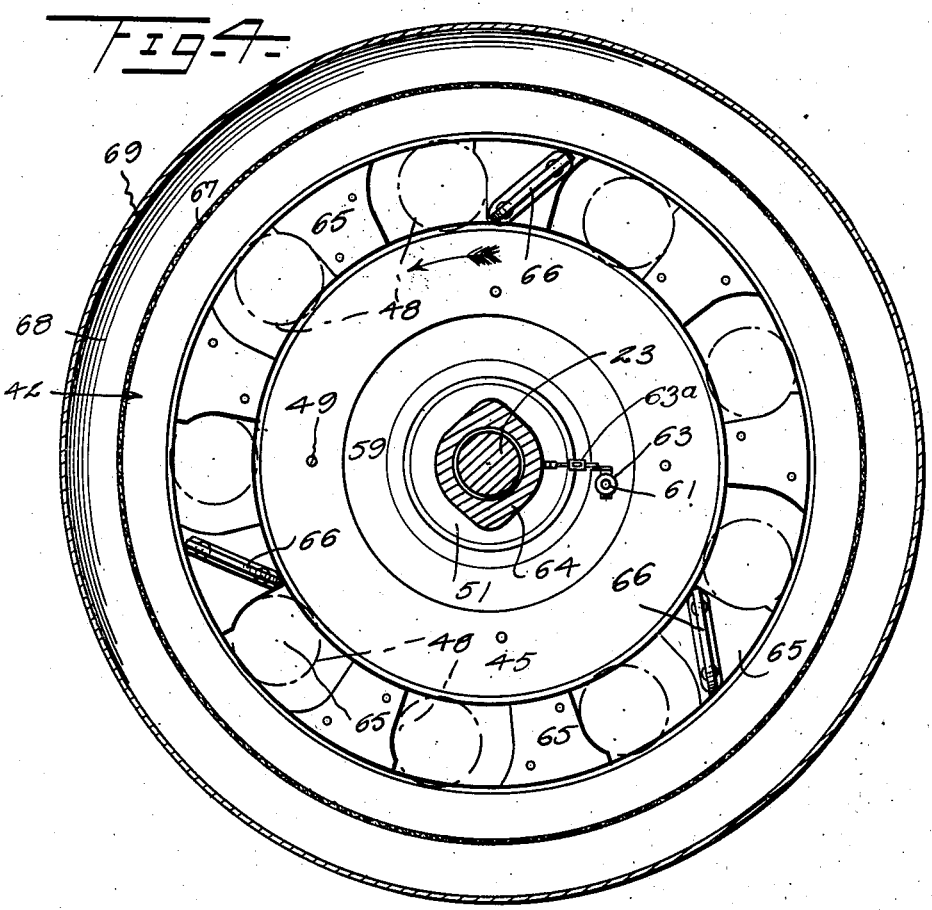
Figure 4 is a horizontal section taken on the plane of line 4—4 of Figure 2.
Figure 5:
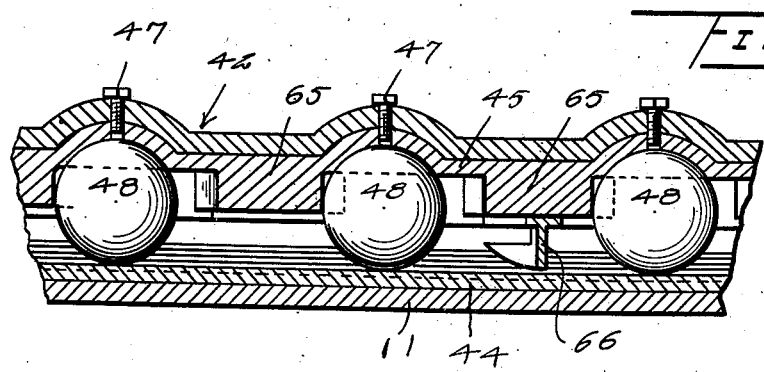
Figure 5 is a section taken on the line 5—5 of Figure 1.

Referring specifically to the drawings wherein like reference characters designate like or similar parts, a suitable lower race member generally designated 10 has a depressed annular raceway or trough at 11 from which an annular wall 12 extends. A suitable number of legs 13 are bolted as at 14 to the ring 12 and they have feet 15 adapted for bolting or fastening as at 16 to a floor 17, whereby the structure is portable.

An inwardly extending flange 18 on the lower raceway, is bolted as at 19 to arms 20 radiating from a hub 21 of a lower spider 22. Journaled in the hub 21 is a vertical shaft 23 having a shoulder at 24, engaging a thrust bearing structure 25 supported by hub 21. Within the hub 21 another roller bearing structure 26 is removably mounted in engagement with shaft 23. Such ball bearing structure 26 is retained by a plate 27 screwed or bolted as at 28 to the hub. A ring 29 is keyed at 30 to shaft 23 and a bevelled gear 31 is screwed or otherwise fastened at 32 to ring 29. A gear casing 33 encloses the aforesaid hub 21, gear 31 and associated parts, being screwed as at 34 to the arms 20 of the spider. Said casing 33 at the bottom is closed by a plate 35 screwed in place at 36.

Journaled in a bearing 37, formed on the casing 33, is a drive shaft 38 having a bevelled gear wheel or pinion 39 thereon enmeshed with the ring gear 31. Shaft 38 may be driven from any suitable source of power as by a belt drive associated with pulleys 40 and 41, respectively fast and loose on said shaft 38.

The lower race member 10 is stationary and coacts with an upper race member 42 which is rotatable and which has pockets 43.

Said raceways 11 and 43, respectively have annular, cast iron linings 44 and 45 therein, respectively, which are arcuate in cross section and secured in place as by means of screws 46 and 47. Adapted to roll and rotate in the raceways and between the lining members 44 and 45, are a suitable number of equidistantly spaced crushing balls 48, nine of them being employed in the form illustrated.

It will be realized that the upper race member 42 rests on the balls 48. Such member in addition to being rotatable is vertically slidable and to this end, at 49 is bolted to arms 50 of the hub 51 of an upper spider 52. Keys or splines 53 are carried by the hub 51 and are slidably mounted in grooves or kerfs 54 in the shaft 23. Said spider 52 and upper race member are urged downwardly through the expansion of a relatively strong coil spring 55 surrounding shaft 23 adjacent the top, which spring also permits upward yielding or automatic adjustment of the upper raceway member. In actual practice, the tension of the spring 55 is approximately five tons. At the top, spring 55 is engaged by a follower ring 56, slidable along the shaft and in turn engaged by a nut 57 screwed to a reduced post 58 at the upper end of the shaft 23 as shown.

An annular hopper or trough 59 is provided for the material to be milled and this hopper has an inverted portion 60 removably fitting over the upper end of shaft 23 and the hub 51 and it is directly engaged by the lower end of the spring 55 for rotatably mounting the hopper with the upper race member 42.

The ore or other material to be ground, is supplied periodically from the trough 59, under appropriate control, through a discharge pipe 61 onto a conical feed plate 62, concentric with the shaft 23, and leading to the raceway of the lower race member 10. The control valve for the pipe 61 is designated 63 and it is operated by a pitman or rod 63a, having a roller for engaging an annular eccentric or cam 64 formed integral with the conical feed plate 62 and loosely around the shaft 23. Said pitman or rod 63a revolves around the stationary cam 64 as a consequence of its being carried by the rotating upper race of the mill. Said cam may be of any desired shape, in order to reciprocate the rod 63 one or any desired number of times during each revolution of the rod around the cam 64, as desired.

Depending from the liner member 45 are partitions 65, one for each ball 48. Such partitions 65 each engage a ball, so as to cause rolling of the ball as the upper race member rotates, in order to cause the balls to grind. In addition, three or any desired number of the partitions 65 have depending impeller blades 66, which are shaped somewhat like plowshares as shown, and which during the rotation of the upper runway, clean the lower raceway, moving the ground material outwardly by centrifugal force and through a screen or sieve 67 disposed peripherally of the race members 10 and 42 and into a surrounding trough 68 formed by an annular member 69 of angular cross section, having a base flange 70 screwed as at 71 to the lower race section 10. Such ground material from the trough 68 may pass therefrom through one or more outlet conduits 72.

If desired, water may be supplied to the surface of the conical supply or feed plate 62, through any desired number of valved inlet pipes 73.

Amalgam may be accommodated in the liner member 44 as through the provision of grooves 74 arranged concentrically therein.

Various changes may be resorted to provided they fall within the spirit and scope of the invention.

I claim as my invention:

1. A mill having means provided with a lower raceway, a second means provided with an upper raceway, said raceways being in opposed relation, balls disposed in the raceways, means operable to rotate the upper raceway and to roll the balls thereby, means slidably mounting the upper raceway, spring means opposing sliding of the upper raceway, a shaft to operate the lower raceway, means above the upper raceway mounted by the latter and by said shaft adjacent the latter for the supply of material to the balls to be ground, means controlling the latter means through rotation of said shaft, consisting of a cam on said shaft, a pitman operable by the cam, and valve means operable by the pitman.

2. A mill of the class described having a lower race member provided with a raceway, means supporting said race member, a spider connected to the race member, a shaft journaled in the spider, gearing to drive said shaft, a conical feed plate concentric with the shaft and leading to said raceway, an upper race member having a raceway in opposed relation to the first mentioned raceway, balls in said raceways to crush material, a spider to which the upper race member is connected, means slidably mounting the last mentioned spider on said shaft and for rotation with the shaft, a supply hopper for material to be milled surrounding the shaft and engaging the last mentioned spider, spring means surrounding the shaft and engaging said hopper, valve control means leading from the hopper to discharge onto said conical feed plate, cam means operable by the shaft to control said valve control means, liner members in said raceways engageable by the balls, partitions on one of the liner members between the balls engageable with the latter to cause rolling thereof, a trough annulus secured to the lower race member, a screen within the latter in the line of discharge between the race members, and an impeller on one of the partitions to cause centrifugal discharge of material through the screen.

3. A mill of the class described having a lower race member provided with a raceway, means supporting said race member, a spider connected to the race member, a shaft journaled in the spider, gearing to drive said shaft, a conical feed plate concentric with the shaft and leading to said raceway, an upper race member having a raceway in opposed relation to the first mentioned raceway, balls in said raceways to crush material, a spider to which the upper race member is connected, means slidably mounting the last mentioned spider on said shaft and for rotation with the shaft, a supply hopper for material to be milled surrounding the shaft and resting on the last mentioned spider, said conical feed plate extending into the upper race member, spring means surrounding the shaft and expansive against said hopper, valved control means leading from the hopper through the second mentioned spider to discharge onto said conical feed plate, and cam means below the second mentioned spider operable by the shaft to control said valved control means.

EDWARD F. McTARNAHAN.